May 5, 1925. 1,536,871
F. H. A. KNACKSTEDT
AIR SUPPLY ATTACHMENT FOR INTERNAL COMBUSTION ENGINES
Filed Feb. 12, 1923
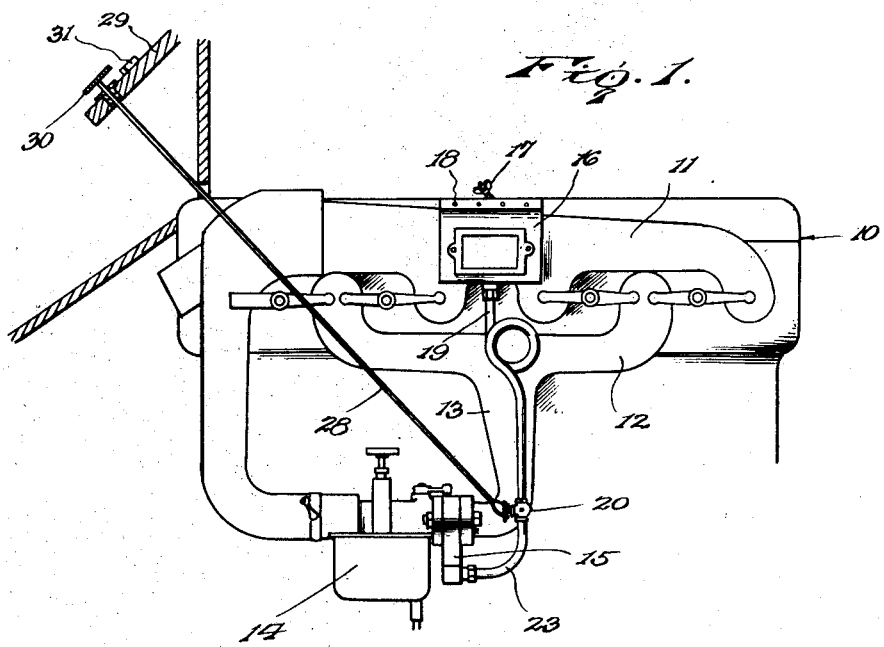
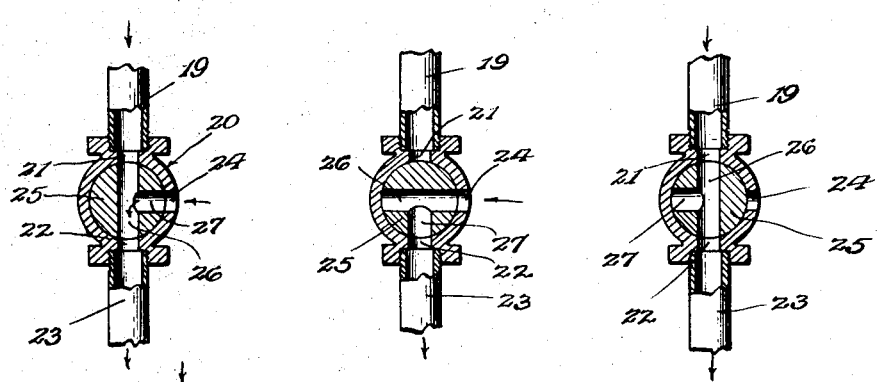
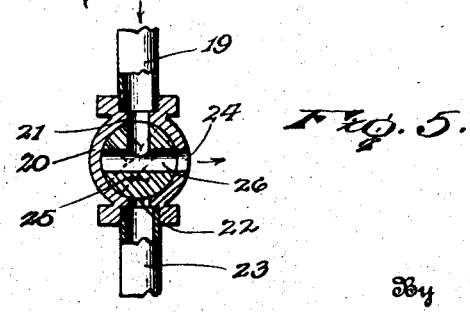
Inventor
*Fred H. A. Knackstedt.*
By
*Lacy & Lacy,* Attorney Patented May 5, 1925.

1,536,871

UNITED STATES PATENT OFFICE.

FRED H. A. KNACKSTEDT, OF STAUNTON, ILLINOIS.

AIR SUPPLY ATTACHMENT FOR INTERNAL-COMBUSTION ENGINES.

Application filed February 12, 1923. Serial No. 618,627.

*To all whom it may concern:*

Be it known that I, FRED H. A. KNACKSTEDT, a citizen of the United States, residing at Staunton, in the county of Macoupin and State of Illinois, have invented certain new and useful Improvements in Air-Supply Attachments for Internal-Combustion Engines, of which the following is a specification.

My invention relates to an attachment suitable for engines of motor vehicles and the object of the invention is to furnish an attachment to admit auxiliary air for mingling with the fuel mixture entering the intake manifold from the carbureter of an internal combustion engine.

A further object of this invention is to so construct this attachment that either hot or cold air may be admitted to the manifold, or air of moderate temperature, or that the auxiliary air supply may be cut off altogether.

The advantage of using this attachment is, that a considerable saving in fuel is gained so that, for instance, a motor vehicle that usually is able to run, say, eighteen miles on a gallon of gasoline can, when supplied with this attachment, increase the mileage to twenty-eight miles per gallon.

Similar attachments are already in existence for supplying hot air only, or cold air only, but no devices are at present available in the market for supplying selectively hot or cold air, or both mixed.

By applying this device to an engine it is possible to start the latter when cool and to facilitate the slowing down of the vehicle previous to stopping, or when changing to a lower speed.

In the accompanying drawing one embodiment of the invention is illustrated; and

Figure 1 shows a side elevation of a part of an internal combustion engine such as is used for motor vehicles and with the improved attachment installed;

Figure 2 is a transverse section of a valve in position for admitting the mixture of hot and cold air to the intake manifold;

Figure 3 is a similar view showing the position of the valve for admitting cold air only;

Figure 4 is a similar view showing the position of the valve for admitting hot air only; and Figure 5 is a similar cross sectional view showing the position of the valve closed, so as to admit neither hot or cold air to the manifold.

In the drawing reference numeral 10 represents a part of an internal combustion engine such as is used on motor vehicles, numeral 11 is the exhaust manifold and reference numeral 12 the intake manifold having a lower branch 13 forming the intake pipe of the manifold. Reference numeral 14 is a carbureter of the usual construction, between which and the lower end of the intake pipe 13, is inserted an air box 15 suitably screened in order to remove all solid impurities whether in the gasoline or the air.

Reference numeral 16 represents a heating casing for the auxiliary air supply secured by a wing nut 17 or the like on the exhaust manifold 11 and partly enfolding the same in order to absorb as much heat as possible therefrom. This casing is provided with small apertures 18 preferably screened to admit air from the atmosphere. At the bottom of the casing 16 is attached a supply pipe 19 preferably coiled and extending down to the air box 15 on the carbureter. This supply pipe 19 provides communication between the interior of the casing 16 and the interior of the air box 15.

In this supply pipe 19 is inserted a three-way valve 20, best seen in Figures 2 to 5 inclusive. The upper end of the valve casing communicates by means of a small port 21 with the supply pipe 19 and through a second port 22 at the lower end thereof with the branch 23 of the supply pipe which leads into the air box 15. At 90° from either of these two ports 21 and 22, a third port 24 is provided on one side of the valve casing 20 communicating directly with the atmosphere.

Within the valve casing 20 is housed in the usual manner the valve body 25, which is revolubly mounted therein and is provided with a diametrical passage 26 and a radial passage 27 communicating with the first passage and both leading to the periphery of the valve body.

A connecting rod 28 suitably attached to the valve body 25 permits manipulation from the dash board 29 by means of a handle 30. Accordingly the valve body 25 may be set in any desired position in the valve casing 20.

When only hot air is required, as for instance when starting the engine after it has been standing in the cold for some time, the valve body 25 is set as indicated in Figure 4. In this position direct communication between the casing 16, containing hot air, and the air box 15, adjacent to the carbureter 14, is open but no communication with the atmosphere is then possible as the passage 27 is turned away from the cold air inlet or port 24.

In case no hot air supply is needed, the valve may be set, as seen in Figure 3, when communication with the cold atmospheric air is obtained through the port 24, main passage 26, radial passage 27, port 22 and the branch 23 of the supply pipe into the air box 15.

In order to have a moderately hot auxiliary air supply for the engine, the valve body 25 is turned, as indicated in Figure 2 of the drawing, in which case, communication is obtained not only with the hot air container 16, through the port 21 and the passage 26, but direct communication with the atmospheric air is obtained through the port 24 and the radial passage 27. The mingled hot and cold air is then led through the valve 20 into the air box 15.

When no auxiliary air supply at all, whether hot or cold or temperate is needed, the valve body 25 is turned, as indicated in Figure 5 of the drawing, in which case the lower port 22, leading into the branch 23 of the supply pipe 19 is entirely closed. The hot air from the casing 16 is, however, in this case led off through the port 24 into the open. Should it be decided to preserve the hot air in the casing 16, the valve body 25 may be turned, as indicated by dotted lines in this figure, so that the diametrical passage 26 stands at an angle of about 45° to the perpendicular, in which case all the ports 21, 22 and 24 are closed.

It is evident that a suitable indicator 31 may be provided on the dash board for accurately positioning the valve body 25 in its casing.

Having thus described the invention what is claimed as new is:

The combination with an internal combustion engine having intake and exhaust manifolds, and a carbureter connected with the intake manifold, of a casing fitting said exhaust manifold and providing a heating chamber, the casing being provided with screened openings for admitting air to the chamber, manually operable fastening means securing the casing to said manifold, an air box inserted between the carbureter and said intake manifold, a pipe connecting said heating chamber with said air box, a valve casing interposed in said pipe and having a cold air port, and a valve body rotatable in the valve casing and having ports to communicate with said cold air port and with the pipe, the valve body being rotatable to one position exclusively admitting hot air to the box from said chamber, to another position exclusively admitting a mixture of hot and cold air to said box, to another position exclusively admitting cold air to the box, to another position shutting off the flow of air to the box and venting said chamber to the atmosphere, and to another position completely closed, the valve being rotatably adjustable for regulating the quantity of hot air, the quantity of mixed hot and cold air, and the quantity of cold air respectively.

In testimony whereof I affix my signature.

FRED H. A. KNACKSTEDT. [L. S.]